(12) United States Patent
Copland et al.

(10) Patent No.: US 11,478,851 B2
(45) Date of Patent: *Oct. 25, 2022

(54) PRODUCING TITANIUM ALLOY MATERIALS THROUGH REDUCTION OF TITANIUM TETRACHLORIDE

(71) Applicant: General Electric Company, Schenectady, NY (US)

(72) Inventors: Evan H. Copland, Melbourne (AU); Albert Santo Stella, Voorheesville, NY (US)

(73) Assignee: General Electric Company, Schenectady, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/343,462

(22) PCT Filed: Oct. 20, 2017

(86) PCT No.: PCT/US2017/057607
§ 371 (c)(1),
(2) Date: Apr. 19, 2019

(87) PCT Pub. No.: WO2018/128665
PCT Pub. Date: Jul. 12, 2018

(65) Prior Publication Data
US 2019/0270140 A1    Sep. 5, 2019

Related U.S. Application Data

(60) Provisional application No. 62/411,224, filed on Oct. 21, 2016.

(51) Int. Cl.
*B22F 9/24* (2006.01)
*B22F 9/20* (2006.01)
(Continued)

(52) U.S. Cl.
CPC ............ *B22F 9/24* (2013.01); *B22F 1/142* (2022.01); *B22F 9/20* (2013.01); *B22F 9/28* (2013.01);
(Continued)

(58) Field of Classification Search
CPC .. B22F 9/24; B22F 1/0085; B22F 9/20; B22F 9/28; B22F 3/1055; B22F 2009/041;
(Continued)

(56) References Cited

U.S. PATENT DOCUMENTS

| 2,745,735 A | 5/1956 | Byrns |
| 2,770,541 A | 11/1956 | Singleton |

(Continued)

FOREIGN PATENT DOCUMENTS

| EA | 022818 B1 | 3/2016 |
| WO | WO00/05017 A1 | 2/2000 |

(Continued)

OTHER PUBLICATIONS

International Search Report and Opinion issued in connection with Corresponding International Application No. PCT/US2017/057588 filed Oct. 20, 2017.

(Continued)

*Primary Examiner* — Anthony M Liang
(74) *Attorney, Agent, or Firm* — Dority & Manning, P.A.

(57) ABSTRACT

Processes are provided for producing a titanium alloy material, such as Ti—Al alloys. In one embodiment, the process includes: heating an input mixture to a preheat temperature with the input mixture including aluminum, optionally, $AlCl_3$, and, optionally ally, one or more alloying element halide; introducing $TiCl_4$ to the input mixture at the first reaction temperature such that substantially all of the $Ti^{4+}$ in the $TiCl_4$ is reduced to $Ti^{3+}$; thereafter, heating to a second reaction temperature such that substantially all of the $Ti^{3+}$ is (Continued)

reduced to $Ti^{2+}$ to form an intermediate mixture (e.g., a $Ti^{2+}$ salt); and introducing the intermediate mixture into a reaction chamber at a disproportionation temperature reaction to form the titanium alloy material from the $Ti^{2+}$ via a disproportionation reaction.

17 Claims, 3 Drawing Sheets

(51) Int. Cl.
    *B22F 1/00*     (2022.01)
    *C22B 34/12*     (2006.01)
    *C22C 1/04*     (2006.01)
    *B22F 9/28*     (2006.01)
    *B22F 1/142*     (2022.01)
    *C22C 14/00*     (2006.01)
    *B22F 9/04*     (2006.01)
    *B22F 10/20*     (2021.01)

(52) U.S. Cl.
    CPC ........ *C22B 34/1272* (2013.01); *C22C 1/0458* (2013.01); *B22F 10/20* (2021.01); *B22F 2009/041* (2013.01); *B22F 2301/205* (2013.01); *B22F 2998/00* (2013.01); *C22C 14/00* (2013.01); *Y02P 10/25* (2015.11)

(58) Field of Classification Search
    CPC ............ B22F 2301/205; B22F 2998/00; B22F 10/20; C22B 34/1272; C22C 1/0458; C22C 14/00; Y02P 10/25
    See application file for complete search history.

(56) References Cited

U.S. PATENT DOCUMENTS

| | | | |
|---|---|---|---|
| 2,835,568 | A | 5/1958 | Kingsbury |
| 3,075,837 | A | 1/1963 | Conklin et al. |
| 3,770,656 | A | 11/1973 | Haag et al. |
| 3,977,863 | A | 8/1976 | Glaeser |
| 4,445,931 | A | 5/1984 | Worthington |
| 8,388,727 | B2 | 3/2013 | Klevtsov et al. |
| 8,562,712 | B2 | 10/2013 | Haidar |
| 8,632,724 | B2 | 1/2014 | Haidar |
| 8,790,441 | B2 | 7/2014 | VanVuuren et al. |
| 8,821,612 | B2 | 9/2014 | Haidar et al. |
| 8,834,601 | B2 | 9/2014 | Haidar |
| 8,894,738 | B2 | 11/2014 | Jacobsen et al. |
| 8,911,529 | B2 | 12/2014 | Withers et al. |
| 9,080,224 | B2 | 7/2015 | Haidar |
| 2003/0234176 | A1 | 12/2003 | Haidar |
| 2006/0191372 | A1* | 8/2006 | Haidar ................ C22B 34/1277 75/10.21 |
| 2006/0230878 | A1* | 10/2006 | Anderson ........... C22B 34/1272 75/367 |
| 2008/0271569 | A1* | 11/2008 | Halalay ..................... B22F 9/24 75/345 |
| 2009/0165597 | A1* | 7/2009 | Haidar ..................... C22B 5/18 75/620 |
| 2010/0282023 | A1* | 11/2010 | Anderson ............... C22B 9/023 75/367 |
| 2011/0091350 | A1* | 4/2011 | Haidar ..................... C22C 1/02 420/420 |
| 2013/0019717 | A1* | 1/2013 | Haidar ..................... C22B 5/04 75/613 |
| 2013/0319177 | A1* | 12/2013 | Haidar ..................... B22F 9/16 75/620 |
| 2014/0069233 | A1* | 3/2014 | Balogh ............... C22B 34/1272 75/370 |
| 2015/0040726 | A1 | 2/2015 | Jacobsen et al. |
| 2015/0275332 | A1 | 10/2015 | Haidar |

FOREIGN PATENT DOCUMENTS

| | | |
|---|---|---|
| WO | WO02/06554 A1 | 1/2002 |
| WO | WO02/070759 A1 | 9/2002 |
| WO | WO2005/002766 A1 | 1/2005 |
| WO | WO2007/109847 A1 | 10/2007 |
| WO | WO2009/129570 A1 | 10/2009 |
| WO | WO2011/072338 A1 | 6/2011 |
| WO | WO2017/219075 A1 | 12/2017 |
| WO | WO2017/219077 A1 | 12/2017 |
| WO | WO2018/006133 A1 | 1/2018 |
| WO | WO2018/075887 A1 | 4/2018 |
| WO | WO2018/075896 A1 | 4/2018 |
| WO | WO2018/128665 A3 | 7/2018 |

OTHER PUBLICATIONS

International Search Report and Opinion issued in connection with Corresponding International Application No. PCT/US17/57600 Filed Oct. 20, 2017.
International Search Report and Opinion issued in connection with Corresponding International Application No. PCT/US2017/057607 Filed Oct. 20, 2017.
Haidar et al., Direct Production of Alloys based on Titanium Aluminides, Elsevier ScienceDirect, vol. 17, Issue 8, Aug. 2009, pp. 651-656. (Abstract Only) https://doi.org/10.1016/j.internet.2009.02.005.
International Search Report Corresponding to Application No. PCT/US2017/057607 dated Jul. 3, 2018.
Translated Russian Search Report Corresponding to Application No. 2019111788 dated Dec. 9, 2019.

* cited by examiner

PRODUCING TITANIUM ALLOY MATERIALS THROUGH REDUCTION OF TITANIUM TETRACHLORIDE

PRIORITY INFORMATION

The present application claims priority to U.S. Provisional Patent Application Ser. No. 62/411,224 filed on Oct. 21, 2017, which is incorporated by reference herein.

FIELD OF THE INVENTION

The present invention relates generally to methods for producing titanium alloy materials through reduction of titanium tetrachloride ($TiCl_4$) in an $AlCl_3$-based reaction media. More particularly, the titanium alloy materials are formed through reducing the $Ti^{4+}$ in the $TiCl_4$ to a lower valence form of titanium (e.g., $Ti^{3+}$ and $Ti^{2+}$), followed by a disproportionation reaction of $Ti^{2+}$ and other alloying elements. Optionally, other alloying elements may also be formed from a salt to the alloy in a reduction and/or disproportionation process.

BACKGROUND OF THE INVENTION

Titanium alloy materials that include aluminum, such as titanium-aluminum (Ti—Al) based alloys and alloys based on titanium-aluminum (Ti—Al) inter-metallic compounds, are very valuable materials. However, they can be difficult and expensive to prepare, particularly in a powder form, and there are certain alloys inaccessible by traditional melt processes. This expense of preparation limits wide use of these materials, even though they have highly desirable properties for use in aerospace, automotive and other industries.

Reactors and methods for forming titanium-aluminum based alloys and inter-metallic compounds have been disclosed. For example, WO 2007/109847 teaches a stepwise method for the production of titanium-aluminum based alloys and inter-metallic compounds via a two stage reduction process, based on the reduction of titanium tetrachloride with aluminum. WO 2009/129570 discloses a reactor adapted to address one of the problems associated with the reactors and methods disclosed in WO 2007/109847, when such are used under the conditions that would be required to form low-aluminum titanium-aluminum based alloys.

However, the discussion of the chemical processes that actually occur in the processes described by WO 2007/109847 and WO 2009/129570 do not represent a complete understanding of the actual reactions occurring to form the metal alloy from metal halide precursors.

In view of these teachings, a need exists for a better understanding of the chemical processes for producing titanium aluminum alloys through reduction of titanium tetrachloride $TiCl_4$, as well as improved processing techniques for such reactions.

The above references to the background art do not constitute an admission that such art forms a part of the common general knowledge of a person of ordinary skill in the art.

BRIEF DESCRIPTION OF THE INVENTION

Aspects and advantages of the invention will be set forth in part in the following description, or may be obvious from the description, or may be learned through practice of the invention.

Processes are generally provided for producing a titanium alloy material, such as Ti—Al alloys. In one embodiment, the process includes: heating an input mixture to a preheat temperature with the input mixture including aluminum, optionally, $AlCl_3$, and, optionally, one or more alloying element chloride; introducing $TiCl_4$ to the input mixture at the first reaction temperature such that substantially all of the $Ti^{4+}$ in the $TiCl_4$ is reduced to $Ti^{3+}$; thereafter, heating to a second reaction temperature such that substantially all of the $Ti^{3+}$ is reduced to $Ti^{2+}$ to form an intermediate mixture (e.g., a $Ti^{2+}$ salt); and introducing the intermediate mixture into a reaction chamber at a disproportionation temperature reaction to form the titanium alloy material from the $Ti^{2+}$ via a disproportionation reaction (along with other optional alloying elements undergoing the disproportionation reaction).

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
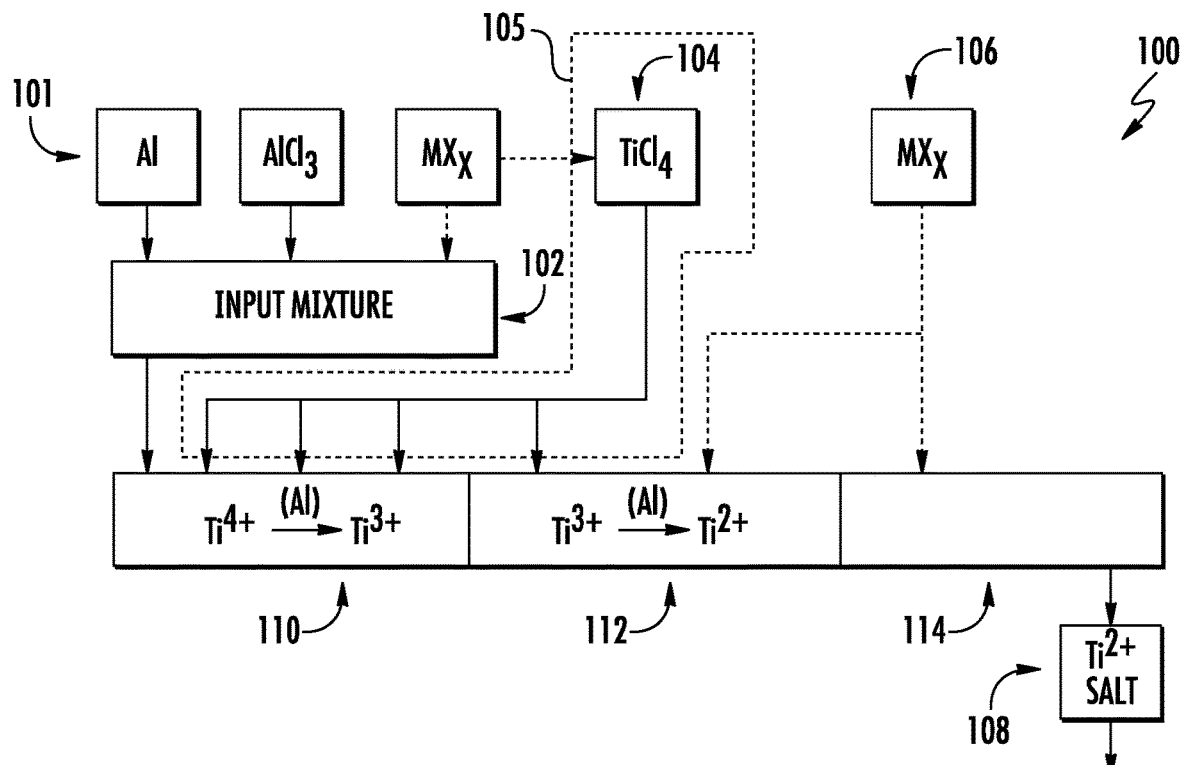
FIG. 1 shows a schematic of one exemplary embodiment of the stage 1 reactions of one exemplary process.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the term "titanium alloy material", or the like, is to be understood to encompass an alloy based on titanium or an alloy based on a titanium intermetallic compound and optionally other additional alloying elements in addition to Ti and Al. Similarly, the term "titanium-aluminum alloy", or the like, is to be understood to encompass an alloy based on titanium-aluminum or an alloy based on titanium-aluminum intermetallic compounds and optionally other additional alloying elements in addition to Ti and Al. It is noted that [Ti] refers to titanium present as a titanium alloy (e.g., alloyed with another element, such as aluminum).

As used herein, the term "aluminum chlorides" is to be understood to refer to aluminum chloride species or a mixture of such aluminum chloride species, including $AlCl_3$ (solid, liquid, or vapor) or any other Al—Cl compounds or ion species (e.g., AlCl, $AlCl_2$, $(AlCl_4)^-$, $Al_2Cl_6$ and $(Al_2Cl_7)^-$). The use of $AlCl_x$ refers to the term "aluminum chlorides" and is to be understood to refer to such aluminum chloride species or a mixture of such aluminum chloride species, no matter the stoichiometric ratio.

As used herein, the term "titanium chloride" is to be understood to refer to titanium trichloride ($TiCl_3$) and/or titanium dichloride ($TiCl_2$), or other combinations of titanium and chlorine, but not to $TiCl_4$, which is referred to herein as titanium tetrachloride. The more general term "$TiCl_x$" may be used, and refers to titanium chloride species and forms of titanium tetrachloride, titanium trichloride, titanium dichloride and/or other combinations of titanium and chlorine in solid, liquid, or vapor forms. Since various solution phases and titanium chloride complexes also exist, the specific oxidation state of the Ti ion (e.g., $Ti^{2+}$, $Ti^{3+}$, and $Ti^{4+}$) in a general phase (i.e., salt mixture) is referred to herein rather than any specific chemical compounds.

As used herein, the term "alloying element halides" refers to an alloying element ion coupled with a halide (e.g., a chloride, a fluoride, a bromide, an iodide, or an astatine). The alloying element can be any element that would be included within the final titanium alloy material, such as metals and other elements. The "alloying element halide" can be represented by $MX_x$, where M is the alloying element ion and X is a halide (i.e., a halogen ion), no matter the stoichiometric ratio (represented by x). For example, an alloying element chloride can be represented by $MCl_x$.

Processes are generally provided for producing titanium alloy materials (e.g., titanium aluminum alloys) through reduction of $TiCl_4$, which includes a titanium 4+ ion ($Ti^{4+}$). More particularly, the titanium alloy materials are formed through reducing the $Ti^{4+}$ in the $TiCl_4$ to a lower valence form of titanium (e.g., $Ti^{3+3+}$ and $Ti^{2+}$), followed by a disproportionation reaction of $Ti^{2+}$ to form the titanium alloy material. It is noted that the valence form of titanium (e.g., $Ti^{4+}$, $Ti^{3+}$, and/or $Ti^{2+2+}$) may be present in the reaction and/or intermediate materials as a complex with other species in the mixture (e.g., chlorine, other elements, and/or other species such as chloro-aluminates, metal halo aluminates, etc.), and may not necessarily be present in pure form of $TiCl_4$, $TiCl_3$, and $TiCl_2$, respectively. For example, metal halide aluminates can be formed by $MX_x$ complexed with $AlCl_3$ in these intermediates, such as described below.

Generally, $AlCl_3$ provides the reaction media that the reactive species (e.g., $Ti^{4+}$, $Ti^{3+}$, $Ti^{2+}$, Al, $Al^+$, $Al^{2+}$, $Al^{3+}$, also alloying element ions) for all reactions. Also, $AlCl_3$ content in the salt solution allows $Ti^{2+}$ to be formed at relatively low temperatures (e.g., about 250° C. or less). Since Al (e.g., in the form of $Al^+$, $Al^{2+}$) serves as the reducing agent, $AlCl_3$ is included in the base salt. For example, additional metal halides could act as a reaction media, such as NaCl—$AlCl_3$, KCl—$AlCl_3$ and NaCl—KCl—$AlCl_3$ to name a few, provided that $AlCl_3$ is present. Without wishing to be bound by theory, it is believed that the use NaCl—KCl—$AlCl_3$ may provide additional composition degrees of freedom to allow ability to adjust $Ti^{2+}/Ti^{3+}$ and $Al^+/Al^{3+}$ in [$Ti^{2+}$:salt] to give control of the Ti-Alloy composition.

FIG. 1 shows a general flow diagram of one exemplary process 100 of the stage 1 reactions, in the form of a continuous stage 1 reactions, that reduce $TiCl_4$ to a $Ti^{2+}$ containing intermediate material (i.e., a $Ti^{2+}$ salt solution). The process 100 is generally shown in sequential zones: adding solid reaction precursors at 101 (including forming an input mixture at 102), adding liquid reaction precursors at 104 at one or more locations, and optionally adding additional reaction components at 106 to create a $Ti^{2+}$ salt at 108. The process 100 includes passing the input mixture through sequential zones (e.g., zone 1 at 110, zone 2 at 112, and zone 3 at 114) while adding additional materials thereto.

I. Reaction Precursors

The solid reaction precursors 101 for the stage 1 reactions in the process 100 of FIG. 1 include, at a minimum, an input mixture that includes aluminum (Al), either alone or with additional chloride components (such as $MX_x$), added at the first zone 110 and liquid $TiCl_4$ 104 added at one or more locations, via a heating zone 105, along the first zone 110 and/or the second zone 112. In one embodiment, the reaction precursors include an input mixture that is supplied as a solid material to the first zone 110 where heating is begun to a preheat temperature (e.g., about 100° C. to about 160° C. as explained in greater detail below), and $TiCl_4$ in liquid form added to the input mixture within the first zone 110 and/or in the second zone 112. For example, liquid $TiCl_4$ can be added while at a first reaction temperature is about 110° C. to about 200° C. (e.g., about 125° C. to about 180° C., such as about 130° C. to about 175° C.). In particular embodiments, $MX_x$ may be added to $TiCl_4$(l). In such an embodiment, the $TiCl_4$ injection system may be heated to help maintain solubility of alloying elements ($MX_x$) within the $TiCl_4$(l).

Additional materials (e.g., $AlCl_3$ and/or other alloying element chlorides) may be included in the reaction precursors at various stages of process 100, such as included within the input mixture, within the $TiCl_4$ (e.g., dissolved within and/or mixed with), and/or as a separate input into the second zone 112 and/or third zone 114. That is, one or more alloying element chlorides 106 can optionally be inputted into the stage 1 reaction materials (e.g., into the input mixture, into the $TiCl_4$ if a liquid, and/or directly into the stage 1 reaction vessel independently, such as into the third zone 114). In certain embodiments, particularly where the alloying element halide is added to liquid $TiCl_4$ (e.g., soluble within), the liquid $TiCl_4$ may be filtering so as to remove any particulate within the liquid stream. Such a filter may, in particular embodiments, refine the liquid stream by removing oxygen species from the liquid, since the solubility of oxygen and oxygenated species is extremely low. As such, filtering of the $TiCl_4$ liquid (with or without any alloying element halide dissolved therein) may tailor the chemistry of the liquid and remove oxygen species therefrom.

For example, the reaction precursors can include some or all alloy elements to achieve a desired chemistry in the titanium alloy material. As stated, the alloying element chloride is represented as $MCl_x$, with M being an alloying element ion that includes metals and other elements that can be included within the final alloy material. It is noted that M may be a major or minor allowing element, including Ti. Particularly suitable alloying element ions can be formed from titanium, vanadium, chromium, niobium, iron, yttrium, boron, manganese, molybdenum, tin, zirconium, silicon, carbon, nickel, copper, tungsten, beryllium, zinc, germanium, lithium, magnesium, scandium, lead, gallium, erbium, cerium, tantalum, osmium, rhenium, antimony, uranium, iridium, and combinations thereof, along with other materials/elements. This flexibility may be achieved through KCl—NaCl—$AlCl_3$ as the reaction medium, which allows the nature of the alloy that can be produced to depend only on the solubility range of M in the molten salt reaction medium.

As shown in FIG. 1 at 102, the input mixture is formed from aluminum (Al), optionally an aluminum chloride (e.g., $AlCl_3$), and optionally one or more alloying element chloride. Generally, Al is the reducing component that transforms $Ti^{4+}$ to $Ti^{2+}$ in the stage 1 reactions. Without wishing to be bound by any particular theory, it is presently believed that $AlCl_3$ is useful as a component in the input mixture, but is not necessarily required if there is an alloying element chloride that is soluble or miscible in the $TiCl_4$ at the stage 1 reaction conditions to form $AlCl_x$ in situ from the alloying element chloride and aluminum. In one embodiment, $AlCl_3$ is included as a material in the input mixture. In this embodiment, the $TiCl_4$ dissolves into the condensed $AlCl_3$-based salt present at the start of the stage 1 reaction, and the reaction products that forms during the stage 1 reaction. In one embodiment, the stage 1 reaction process involves adding $TiCl_4$ at a sufficient flow rate such that excess $AlCl_3$ or $TiCl_3(AlCl_3)_x$ reaction product is always present to ensure $TiCl_4$ adsorption and dissolution into $AlCl_3$ and $TiCl_3$ $(AlCl_3)_x$.

However, in another embodiment, the input mixture may be substantially free from $AlCl_3$. As used herein, the term "substantially free" means no more than an insignificant trace amount present and encompasses "completely free" (e.g., "substantially free" may be 0 atomic % up to 0.2 atomic %). If $AlCl_3$ is not present in the input mixture, then Al and other metal chlorides are present and utilized to form $AlCl_3$ such that the stage 1 reaction can proceed.

If in a solid state at ambient conditions, one or more alloying element chlorides ($MCl_x$) can optionally be included into the input mixture to form the input mixture. Particularly suitable alloying element chlorides in a solid state to be included with the aluminum and optional $AlCl_3$ include, but are not limited to, $VCl_3$, $CrCl_2$, $FeCl_2$, $FeCl_3$, $YCl_3$, $BCl_3$, $MnCl_2$, $MoCl_3$, $MoCl_5$, $SnCl_2$, $ZrCl_4$, $NiCl_2$, $CuCl$, $CuCl_2$, $WCl_4$, $WCl_6$, $BeCl_2$, $ZnCl_2$, $LiCl$, $MgCl_2$, $ScCl_3$, $PbCl_2$, $Ga_2Cl_4$, $GaCl_3$, $ErCl_3$, $CeCl_3$, and mixtures thereof.

In one embodiment, the input mixture is in the form of a plurality of particles (i.e., in powder form). For example, the input mixture is formed by milling a mixture of the aluminum (Al), optionally an aluminum chloride (e.g., $AlCl_3$), and optionally one or more alloying element chloride. The material of the input mixture can be combined as solid materials and milled together to form the plurality of particles having a mixed composition. In one embodiment, a mixture of aluminum particles, optionally aluminum chloride particles, and optionally particles of one or more alloying element chlorides is mixed and milled together to form the plurality of particles of the input mixture. For example, the aluminum particles can be aluminum particles that have a pure aluminum core with an aluminum oxide layer formed on the surface of the particles. Alternatively, the aluminum particles can include a core of aluminum and at least one other alloying element. The aluminum particles may have any suitable morphology, including a flake like shape, substantially spherical shape, etc.

Since the aluminum particles generally form a layer of aluminum oxide on the surface of the particles, the milling process is performed in an atmosphere that is substantially free of oxygen to inhibit the formation of any additional aluminum oxides within the input mixture. For example, the milling process can be performed in an inert atmosphere, such as an argon atmosphere, having a pressure of about 700 torr to about 3800 torr. Without wishing to be bound by any particular theory, it is believed that a reaction between $AlCl_3$ and surface $Al_2O_3$ during milling of Al(s) such that $AlCl_3$ converts $Al_2O_3$ to AlOCl (e.g., via $Al_2O_3 + AlCl_3 \rightarrow 3AlOCl$). The $Al_2O_3$ surface layer protects the underlying Al(s), and then converting this $Al_2O_3$ surface layer to AlOCl during milling allows Al to dissolve and diffuse into the salt, as $Al^+$ of $Al^{2+}$. As such, the resulting particles are an "activated" Al powder.

Additionally, reducing the size of the particles allows the surface area of the particles to increase to expand the availability of aluminum surface area in the subsequent reduction reactions. The plurality of particles may have any suitable morphology, including a flake like shape, substantially spherical shape, etc. In particular embodiments, the plurality of particles of the input mixture have a maximum average size in at least one dimension of about 0.5 µm to about 25 µm (e.g., about 1 µm to about 20 µm). For example, in one embodiment, the flake may define a planar particle having dimensions in an x-y plane, and a thickness in a z-dimension with the maximum average size of about 0.5 µm to about 25 µm (e.g., about 1 µm to about 20 µm), while the x- and y-dimensions having larger average sizes. In one embodiment, milling is performed at a milling temperature of about 40° C. or less and for less than a critical time to inhibit Al particle agglomeration (e.g., about 10 hours or less).

Milling can be achieved using a high intensity process or a low intensity process, or any other size reduction apparatus, to produce the plurality of particles of the input mixture, such as using a ball mill.

However, milling and/or mixing the components of the input mixture is optional according to one embodiment where the input mixture is mixed in a liquid form (e.g., melted, dissolved into a solution, etc.) prior to adding the $TiCl_4$.

II. Stage 1 Reactions (reduction of $Ti^{4+}$ to $Ti^{3+}$ and $Ti^{3+}$ to $Ti^{2+}$)

In the first zone 110, the solid reaction precursors (e.g., input mixture 102) is heated in an inert environment. In one particular embodiment, the first zone 110 is in an inert condition (e.g., an inert atmosphere with a total pressure of about 0.5 atm to about 5 atm, such as about 0.5 to about 1.5 atm) such that any vapor present in the first zone 110 (and subsequent second and third zones 112, 114) has evolved from the stage 1 reaction products and the injected reaction materials, such as $TiCl_4$. A flowing inert gas may or may not be utilized within the reaction chamber. In one embodiment, the input mixture is heated prior to adding the $TiCl_4$. For example, the reaction precursors are, in one particular embodiment, heated to a preheat temperature that is about 160° C. or less (e.g., about 100° C. to about 140° C., such as about 120° C. to about 135° C.) in the first reaction zone.

Then, in the first zone 110 and/or in the second zone 112, $TiCl_4$ is added to the heated input mixture that includes aluminum (Al), and may include additional materials (e.g., $AlCl_3$ and/or other alloying element chlorides). The $TiCl_4$ may be a pure liquid of $TiCl_4$ or liquid mixed with other alloy chlorides. Mixtures of $TiCl_4$ and another alloy chloride(s) may be heated, in certain embodiments, to ensure that the resulting solution is not saturated, which could result in components precipitating out of the solution. An example of mixed liquid precursors includes a mixture of $TiCl_4$ and $VCl_4$ to form a vanadium containing titanium alloy. Various metal chlorides (i.e., $AlCl_3$, $VCl_4$, $VCl_3$, $MCl_x$, etc) may be dissolved into $TiCl_4$(l), which can be represented by $(TiCl_4)_x(AlCl_3)_y(MCl_x)_z$ where M is any suitable metal, as discussed herein, and x, y, and z are the mole fraction of the particular components of the salt solution. Such a salt solution can be generally defined in short hand as [$Ti^{4+}$:salt], with the brackets [ ] represent the material as a solution phase having $Ti^{4+}$ as the major species of solvent and "salt" represents all of the minor species or alloying elements.

That is, the $TiCl_4$ is added to the heated input mixture for reduction of the $Ti^{4+}$ to $Ti^{3+}$ (in the first zone 110 and/or at the beginning of the second zone 112) and for reduction of the $Ti^{3+}$ to $Ti^{2+}$ (in the second zone 112). At the stage 1 reactions in the process 100, the $Ti^{4+}$ is reduced to $Ti^{3+}$ by alumino-thermic reduction in the first zone 110 and/or in the second zone 112 at the first reaction temperature, and then the $Ti^{3+}$ is further reduced to $Ti^{2+}$ by alumino-thermic reduction at a second reaction temperature in the second zone 112, with the second reaction temperature being greater than the first reaction temperature. In the embodiment shown, these reactions are performed in sequential reactions at different temperatures in a single reactor as separate steps as a multi-step process.

Without wishing to be bound by any particular theory, it is believed that the aluminum (e.g., in a form of metallic aluminum or a salt of aluminum such as $AlCl_3$ and/or $AlCl_x$) present the input mixture reduces the $Ti^{4+}$ in the $TiCl_4$ to $Ti^{3+}$ by an alumino-thermic process at the first reaction temperature, where $AlCl_3$ serves as the reaction media in the form of a $AlCl_3$ salt solution. Without wishing to be bound by any particular theory, it is believed that $Ti^{4+}$ and Al dissolve in $AlCl_3$ and in $TiCl_3(AlCl_3)_x$ formed from the input mixture reaction products, such that the $Ti^{4+}$ and Al can react. It is also believed that Al dissolves in the salt as $Al^+$ or $Al^{2+}$, and that these Al species diffuse to the $Ti^{4+}$ and react to form new $TiCl_3(AlCl_3)_x$ reaction product. Finally, it is believed that Al dissolves into the salt solution through an $AlCl_3$ or AlOCl layer that protects the surface of the Al. For example, without wishing to be bound by any particular theory, it is believed that the $Ti^{4+}$ in the $TiCl_4$ is reduced to $Ti^{3+}$ in the form of $TiCl_3$ complexed with metal chloride(s), such as $TiCl_3(AlCl_3)_x$ with x being 0 to 10 (e.g., x being 1 to 5), which is either a continuous solid solution between $TiCl_3$ and $AlCl_3$ or two solutions $TiCl_3$-rich $TiCl_3(AlCl_3)_x$ and $AlCl_3$-rich $TiCl_3(AlCl_3)_x$ where both solutions have similar crystal structures. Thus, it is believed that substantially all of the $Ti^{3+}$ species formed is in the form of such a metal chloride complex, instead of pure $TiCl_3$.

As such, the resulting reaction product is an $AlCl_3$-based salt solution that includes the $Ti^{3+}$ species. Similar to the [$Ti^{4+}$:salt] discussion above, various metal chlorides (i.e., $AlCl_3$, $VCl_4$, $VCl_3$, $MCl_x$, etc.) dissolve in $TiCl_3$ (solid or liquid), which may be represented by $(TiCl_3)_x(AlCl_3)_y(MCl_x)_z$ where M is any suitable metal and x, y, and z represent the mole fraction of the salt solution. $TiCl_3(AlCl_3)_x$ is a sub-set of the larger solution phase, even though all of the alloying element chlorides, $MCl_x$, dissolve into this solution phase. Additionally, $Ti^{4+}$ also dissolves into this solution phases, which can be described as the Cl-rich side of the phase field. Such a salt solution can be generally defined in short hand as [$Ti^{3+}$:salt], with the brackets [ ] represent the material as a solution phase having $Ti^{3+}$ as the major species of solvent and "salt" represents all of the minor species or alloying elements.

For example, the reduction of $Ti^{4+}$ to $Ti^{3+}$ can be performed at first reaction temperature of about 110° C. to about 200° C. (e.g., about 125° C. to about 180° C., such as about 130° C. to about 175° C.).

This reaction can be performed as $TiCl_4$ is added to the input mixture as a solid and/or liquid (e.g., injected into and/or bubbled through) in a controlled manner to the heated input mixture at the first reaction temperature within the first zone 110. For example, the $TiCl_4$ can be added continuously or in a semi batch manner. In the shown embodiment, the stage 1 process is a continuous reaction process. For example, all of the $TiCl_4$ added is reduced to the $Ti^{2+}$ salt in the intermediate mixture, since there is no removal mechanism in the closed reaction process (e.g., no flow of inert gas to carry away excess $TiCl_4$), which is drive by the oxidation of Al where the stoichiometric amount of Al was oxidized to produce [$Ti^{2+}$:salt]. As such, $TiCl_4$ can be added to the input mixture in an amount equal to the stoichiometric amount required forming the desired amount of $Ti^{3+}$ in the intermediate mixture. Excess Al may be present in the first zone and/or the second zone, but all the Al(s) should also be consumed by the end of the third zone and in 108 (e.g., Al is dissolved in [Ti2+:salt]).

In one embodiment, the reduction of $TiCl_4$ is performed by heating to a temperature that is above the boiling point of $TiCl_4$ (e.g., about 136° C.) but below the temperature where $Ti^{3+}$ is further reduced (e.g., over about 180° C.), such as a reaction temperature of about 160° C. to about 180° C. (e.g., about 160° C. to about 180° C.). However, it is noted that Al is capable of reducing $Ti^{4+}$ to $Ti^{3+}$ and $Ti^{3+}$ to $Ti^{2+}$ at all temperatures, including below 20° C. The temperatures identified above are due to kinetic limitations and/or solid state transport in the reaction products. Also, without wishing to be bound by any particular theory, it is believed that the $Ti^{3+}$ to $Ti^{2+}$ reduction cannot occur while $Ti^{4+}$ exists in the stage 1 reaction products due to the Gibbs phase rule and phase equilibria of the Ti—Al—Cl—O system. That is, Al oxidation can drive both reduction steps at the same temperature, but the sequential aspect of these reactions is due to the present belief that $Ti^{4+}$ and $Ti^{2+}$ cannot exist at the same time in an isolated system. Thus, the reactions are sequentially performed such that substantially all of the $Ti^{4+}$ is reduced to $Ti^{3+}$ prior to the formation of $Ti^{2+}$ in the system. Thus, the reduction process is performed by the presently disclosed methods in a sequential nature.

Then, the $Ti^{3+}$ can be further reduced to $Ti^{2+}$ by aluminothermic reduction in the second zone 112 at a second reaction temperature. For example, the reduction of $Ti^{3+}$ to $Ti^{2+}$ can be performed at second reaction temperature of about 180° C. or higher (e.g., about 180° C. to about 500° C., such as about 180° C. to about 300° C.). Without wishing to be bound by any particular theory, it is believed that the reaction may form a $Ti^{2+}$ salt, such as in the form of a $TiCl_2$ complexed with metal chloride(s), such as $TiAlCl_5$, $Ti(AlCl_4)_2$, or a mixture thereof. For example, without wishing to be bound by any particular theory, it is believed that $AlCl_3$ is chemically bound in $TiCl_3(AlCl_3)_x$, $TiAlCl_5$, and $\{Ti(AlCl_4)_2\}_n$ in this process. Due to its significant chemical activity (e.g., <1), $AlCl_3$ does not evaporate as would be expected for pure $AlCl_3$, and there is no significant $AlCl_3$ evaporation until reaction temperatures reach or exceed about 600° C. Thus, $AlCl_3$ provides the reactor medium to allow the reaction to take place, and $AlCl_3$ provides the chemical environment that stabilizes the $Ti^{2+}$ ion and allows conversion of $Ti^{3+}$ to $Ti^{2+}$ at reaction temperatures less than about 250° C. (e.g., about 180° C. to about 250° C.).

Without wishing to be bound by any particular theory, it is generally believed that there are three forms of $Ti^{2+}$ possible: (1) substantially pure $TiCl_2$ that only dissolves a small amount of anything, (2) $TiAlCl_5(s)$ that also does not dissolve much of anything else and is probably only stable up to about 200° C., and (3) $\{Ti(AlCl_4)_2\}_n$ that is likely an inorganic polymeric material existing as a liquid, glassy material and fine powder (long chain molecules). That is, $\{Ti(AlCl_4)_2\}_n$ has a large range (e.g., n can be 2 to about 500, such as 2 to about 100, such as 2 to about 50, such as 2 to about 10), indicating the number of repeating $Ti(AlCl_4)_2$ units, and dissolves all the alloy element chlorides. As a result, the reaction product comprising $Ti^{2+}$ is a phase based on the complex between $TiCl_2$ and $AlCl_3$ (e.g., $Ti(AlCl_4)_2$, etc.). Such a complex can be a salt solution defined in short hand as $[Ti^{2+}:salt]$, with the brackets [ ] represent the material as a solution phase having $AlCl_3$ as the major species of solvent, $Ti^{2+}$ and "salt" represents all of the minor species or alloying elements.

In yet another embodiment, the reactions occurring within the first zone 110 and the second zone 112 can occur simultaneously at reaction temperatures associated with the second reaction temperature (e.g., about 180° C. to about 500° C., such as about 180° C. to about 300° C.) by adding $TiCl_4$ into the input mixture at the second reaction temperature. Some or all of the $TiCl_4$ may be added at this point of the reaction process (e.g., at about 180° C. to about 500° C., such as about 180° C. to about 300° C.).

During these reactions, the input mixture can substantially remain a solid within the first zone 110. Within the second zone 112 and the third zone 114, the reaction product can be either or both a solid or liquid. For example, the third reaction temperature can be about 200° C. or higher (e.g., about 200° C. to about 500° C., such as about 250° C. to about 350° C.) to ensure that all of the $Ti^{3+}$ is reduced to $Ti^{2+}$ while simultaneously homogenizing the resulting $Ti^{2+}$ salt. In particular embodiments, the reactions are performed in a plow reactor, a ribbon blender, or a number of other liquid/solid/vapor reactor.

In certain embodiments, the stage 1 reactions can be performed in an inert atmosphere (e.g., comprising argon). As such, the uptake of oxygen ($O_2$), water vapor ($H_2O$), nitrogen ($N_2$), carbon oxides (e.g., CO, $CO_2$, etc.) and/or hydrocarbons (e.g., $CH_4$, etc.) by aluminum and/or other compounds can be avoided during the reduction reaction. In particular embodiments, the inert atmosphere has a pressure of 1 atmosphere (e.g., about 760 torr) and about 5 atmospheres (e.g., about 3800 ton), such as about 760 torr to about 1500 torr. Although pressures less than about 760 torr could be utilized in certain embodiments, it is not desirable in most embodiments due to possible oxygen, water, carbon oxide and/or nitrogen ingress at such lower pressures. For example, the inert atmosphere has a pressure of 0.92 atmosphere (e.g., about 700 torr) and about 5 atmospheres (e.g., about 3800 torr), such as about 700 torr to about 1500 torr. On the other hand, the stage 1 reactions can be performed in equilibrium with a vapor phase that has originated from the reaction products inside the reactor (i.e., without the addition of an inert gas).

At the completion of the stage 1 reactions, the intermediate mixture leaves the reactions conditions of the third zone 114 as a solid or liquid and enters a storage vessel 108. This storage vessel can be at a temperature of about 200° C. or higher (e.g., about 200° C. to about 500° C., such as about 250° C. to about 350° C.) and at a pressure of 1 atmosphere (e.g., about 760 torr) and about 5 atmospheres (e.g., about 3800 torr). Alternatively, the intermediate mixture can be cooled to a temperature below about 100° C., such below about 50° C. For example, the intermediate solid mixture could be stored at room temperature.

In one embodiment, there is no excess Al within the intermediate mixture stored in 108. While stored, the intermediate mixture of the $Ti^{2+}$ salt may be measured and adjusted to make it the specific composition required to make the desired Ti—Al alloy. Thus, the composition can be adjusted as desired by adding additional alloying elements. Similarly, the composition can be measured and adjusted in the third zone 114.

It is noted that the intermediate mixture will contain dissolved Al in the $Ti^{2+}$ salt, but no particles of Al metal.

III. Stage 2 Reaction (Disproportionation Reaction of $Ti^{2+}$ to Ti)

Figure 2:
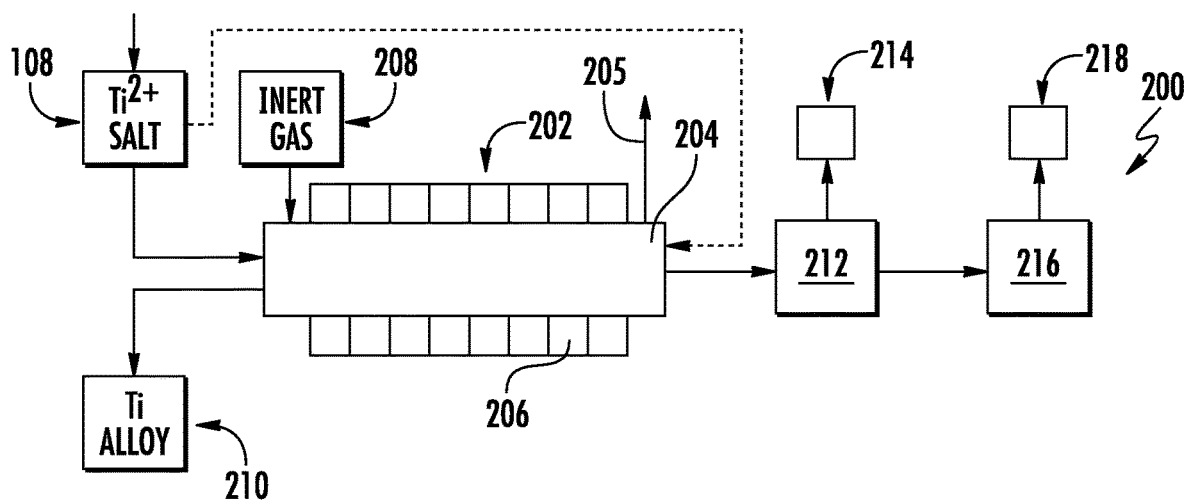
FIG. 2 shows a schematic of one exemplary embodiment of the stage 2 reaction and post-processing of the resulting titanium alloy material of one exemplary process.

The $Ti^{2+}$ within the $Ti^{2+}$ salt (e.g., in the form of $TiCl_2$ complexed with Al and/or metals) can be reduced to Ti alloy via a disproportionation reaction in Stage 2 reactions 200 as shown in FIG. 2, with the $Ti^{2+}$ salt being added to the reaction chamber 204 at both ends (e.g., simultaneously added at both ends). For example, the $Ti^{2+}$ can be reduced to Ti alloy via an endothermic disproportionation reaction at a disproportionation reaction temperature of about 250° C. or higher, such as about 300° C. or higher (e.g., about 300° C. to about 1000° C., such as about 500° C. to about 1000° C.). Although the third reaction temperature may extend to about 1000° C. in certain embodiments, the third reaction temperature has an upper temperature limit of about 900° C. in other embodiments. For example, the $Ti^{2+}$ can be reduced to Ti alloy via a disproportionation reaction at a third reaction temperature of about 300° C. up to about 900° C. (e.g., about 300° C. to about 900° C., such as about 500° C. to about 900° C.).

Generally, the Ti alloy formation can be divided into two processes: nucleation and particle growth (which may also be referred to as particle coarsening). During nucleation, the first Ti alloy forms from the $[Ti^{2+}:SALT]$ at lower temperatures (e.g., about 250° C. to about 400° C.). The local composition of the salt (component activities), surface energy, and kinetics of disproportionation determine the resulting Ti alloy composition. Then, the particle growth occurs where the Ti alloy continues to grow from the $[Ti^{2+}:SALT]$ at higher temperatures (e.g., about 400° C. to about 700° C.) in the condensed state and at temperatures of greater than 700° C. (e.g., about 700° C. to about 1000° C.) in as a gas solid reaction. These higher temperature reactions (e.g., greater than about 700° C.) can also be described as a distillation process where Cl is removed from the Ti alloy product, which is occurring simultaneously with the Ti alloy particle grown. Both of these processes are based on a disproportionation reaction, but could produce Ti alloys of different compositions. It is also noted that there is a disproportionation reaction for both Ti and Al in the reaction process: $Ti^{2+}=\frac{1}{3}[Ti]+\frac{2}{3}Ti^{3+}$ and $Al^+=\frac{2}{3}[Al]+\frac{1}{3}Al^{3+}$.

Without wishing to be bound by any particular theory, it is believed that keeping the third reaction temperature below about 900° C. ensures that any oxygen remains as stable vapor species and limit oxygen contamination in the resulting Ti alloy product. On the other hand, at reaction temperatures above 900° C., the oxygen contaminants are no longer in the form of volatile species making it more difficult to reduce residual oxygen. Any other volatile species, such as oxychlorides or chlorides and/or oxides containing carbon, can be removed by thermal distillation.

In one embodiment, the $Ti^{2+}$ salt having the $Ti^{2+}$ is maintained at the disproportionation reaction temperature until substantially all of the $Ti^{2+}$ is reacted to the titanium alloy material. In the reaction, any $Ti^{3+}$ formed during the disproportionation reactions is removed from the reaction chamber and collected to be externally recycled. As such, the $Ti^{3+}$ is removed from the reactor via a condensers and/or desublimators or as an aerosol form in 204 that is collected in a filter system (where condenser, desublimator and/or filter are collectively 212, 216) in the vent system and is collected as $TiCl_3(AlCl_3)_x$ which may be recycled externally from system 200 in FIG. 2. Similarly, any $Ti^{4+}$ (e.g., in the form of $TiCl_4$) may be formed during other disproportionation reaction may be evacuated out of the reaction system as a gas by-product for collection and external recycling.

In one embodiment, the stage 2 reaction (e.g., $Ti^{2+}$ to Ti alloy) can be performed in an inert atmosphere, such as comprising argon. In particular embodiments, the inert atmosphere has a pressure of 1 atmosphere (e.g., about 760 torr) and about 5 atmospheres (e.g., about 3800 torr), such as about 760 torr to about 1500 torr. The use of a low impurity inert gas (e.g., low impurity argon gas, such as a high purity argon gas) process gas is preferred to minimize the formation of oxychloride phases such as $TiOCl_x$ and $AlOCl_x$ in the process, and to ultimately inhibit the formation of TiO, $TiO_2$, $Al_2O_3$, and/or $TiO_2-Al_2O_3$ mixtures. Other inert gases can also be used, such as helium or other noble gases, which would be inert to the reaction process.

For example, the Ti is formed in a Ti—Al based alloy from the $Ti^{2+}$ in salt solution (condensed and vapor) by disproportionation and the formation of $Ti^{3+}$ in a salt solution (condensed and vapor), as described above ($Ti^{2+}=\frac{1}{3}[Ti]+\frac{2}{3}Ti^{3+}$). During the stage 2 reaction, a supersaturated [$Ti^{2+}$:salt] vapor may be formed, that leads to the growth of Ti-alloy particles from the supersaturated vapor. In certain embodiments, focused energy beam can be used to heat the surface Ti-Alloy particles directly to promote continued growth of the particles from the vapor.

Similar corresponding disproportionation reactions are occurring simultaneously for $Al^+/Al/Al^{3+}$ and other alloying elements dissolved in the salt solutions and forming in the Ti—Al based alloys. Thus, pure-Ti products are not formed during these disproportionation reactions. Without wishing to be bound by any particular theory or specific reaction sequence, the Ti—Al alloy formation is believed to occur via an endothermic reaction which involves the input of heat to drive the reaction to towards the Ti—Al alloy products.

The Ti—Al alloy formed by the reactions above can be in the form of a Ti—Al alloy mixed with other metal materials. Through control of the system, fine, uniformly alloyed particulates can be produced of the desired composition through control of at least temperature, pressure, gas flow-rate, $Al/AlCl_3$ ratio, and particle size/state of aggregation of the $Ti^{2+}/Al/AlCl_3$ mixture entering the stage 2 reaction from 108. The process is designed to allow for uniform mixing and continuous flow through the reaction zone.

As a reaction product of the stage 2 reactions, a titanium alloy material is formed that includes elements from the reaction precursors and any additional alloying elements added during the stage 1 reaction and/or the stage 2 reactions. For example, Ti-6Al-4V (in weight percent), Ti-4822 intermetallic (48Al, 2Cr, and 2Nb in atomic percent) can be formed as the titanium alloy material. In one embodiment, the titanium alloy material is in the form of a titanium alloy powder, such as a titanium aluminide alloy powder (e.g., Ti-6Al-4V, Ti-4822, etc.).

Referring to FIG. 2, a process schematic 200 of one exemplary embodiment of the stage 2 reaction is generally shown. The $Ti^{2+}$ salt intermediate material 108 (formed by the stage 1 reactions of the exemplary process 100 of FIG. 1) serves as the starting material. In the embodiment shown, the $Ti^{2+}$ salt intermediate material 108 is added to a heated reaction apparatus 202 (e.g., a rotary kiln) that includes a reaction chamber 204 and heating elements 206. The heating elements 206 can heat the $Ti^{2+}$ salt intermediate material 108 within the reaction chamber 204 to the third reaction temperature for the disproportionation reaction. In one embodiment, the heating elements 206 can heat separate zones within the reaction chamber so as to vary the temperature within the reaction chamber by different zones. The Ti alloy material 210 can be collected in an alloy tank or other collection device. In one embodiment, the Ti alloy material 210 is in powder form.

As shown in FIG. 2, an inert gas 208 can be introduced as a flow to regulate the reaction atmosphere, and to carry gaseous and aerosols of titanium chloride aluminum chloride and their complexes (e.g., $TiAlCl_6$, $AlCl_3$ $Al_2Cl_6$, $TiCl_3$, $TiOCl_x$ and/or $AlOCl_x$ vapor away from the titanium alloy material. For example, any $Ti^{3+}$ and $Ti^{4+}$ products (e.g., $TiCl_4$) produced during the reaction may be carried out of the reactor as a take-off by-product, which may be recycled for further reduction. Thus, the reaction can be performed efficiently without any significant waste of Ti materials.

In the embodiment of FIG. 2, the inert gas (e.g., argon) can flow through the reaction chamber 204 and out of the reaction chamber 204 via vent 205 into a first sublimation chamber 212, where $Ti^{3+}$ substituents (e.g., $TiCl_3-AlCl_x$) are re-captured into the first storage tank 214. For example, the first sublimation chamber 212 may be an $AlCl_3$ condenser, with a temperature at room temperature (e.g., about 20° C.) to about 100° C. In such an embodiment, $TiCl_3$ may form as smoke in chamber 204, with chamber 212 is an $AlCl_3$ condenser such that tank 214 collects $AlCl_3(s)$ and chamber 216 is a filter system for collecting $TiCl_3(s)$. Alternatively, the first sublimation chamber 212 has, in one embodiment, a temperature of about 200° C. to about 500° C. and is at the pressure of the reactors, so as to serve as a condenser at about 200° C. to about 500° C. In this embodiment, $TiCl_3$ does not form as smoke in chamber 204, in which case condenser 212 has a temperature of about 200° C. to about 500° C. for collecting $TiCl_3(s)$ such that tank 214 collects $TiCl_3(s)$, while condenser 216 is an $AlCl_3$ condenser at room temperature (e.g., about 20° C.) to about 100° C. and $AlCl_3(s)$ is collected in tank 218. As such, $TiCl_3$ and $AlCl_3$ are recycled.

Such recovered $Ti^{3+}$ substituents may be recycled and reintroduced into the stage 1 reactions (e.g., with the input materials in the first zone 110 shown in FIG. 1). For example, $MX_x$ in 101 can include the option of being $TiCl_3(AlCl_3)_x$ from 214 in addition to other alloying additions, since the material in 214 generally has a small amount of $AlCl_3$ present.

Then, in the embodiment of FIG. 2, the inert gas (e.g., argon) can flow through and out of the first sublimation chamber 212 and into a second sublimation chamber 216, where $AlCl_3$ is re-captured into the second storage tank 218. The inert gas may be vented or scrubbed, as desired. The first sublimation chamber 212 has, in one embodiment, a temperature of about 50° C. to about 150° C. and is at the pressure of the reactor. The $AlCl_3$ can be purified/recycled and reintroduced into the stage 1 reactions (e.g., with the input materials in the first zone 110 shown in FIG. 1).

In-process monitoring can be used to determine reaction completion by measuring the mass balance, temperature, pressure, process gas chemistry, output product chemistry, and by-product chemistry.

IV. Post Processing of Titanium Alloy

After formation, the titanium alloy material may be processed. For example, the titanium alloy powder can be processed for coarsening, sintering, direct consolidation, additive manufacturing, bulk melting, or spheroidization. For example, the titanium alloy material may be high temperature processed to purify the Ti alloy by removing residual chlorides and/or allowing diffusion to reduce composition gradients, such as at a processing temperature of about 800° C. or higher (e.g., about 800° C. to about 1,000° C.).

In one embodiment, the high temperature processing also continues disproportionation reactions to produce Ti alloy from any residual $Ti^{2+}$.

V. Exemplary Process Schematics

Figure 3:
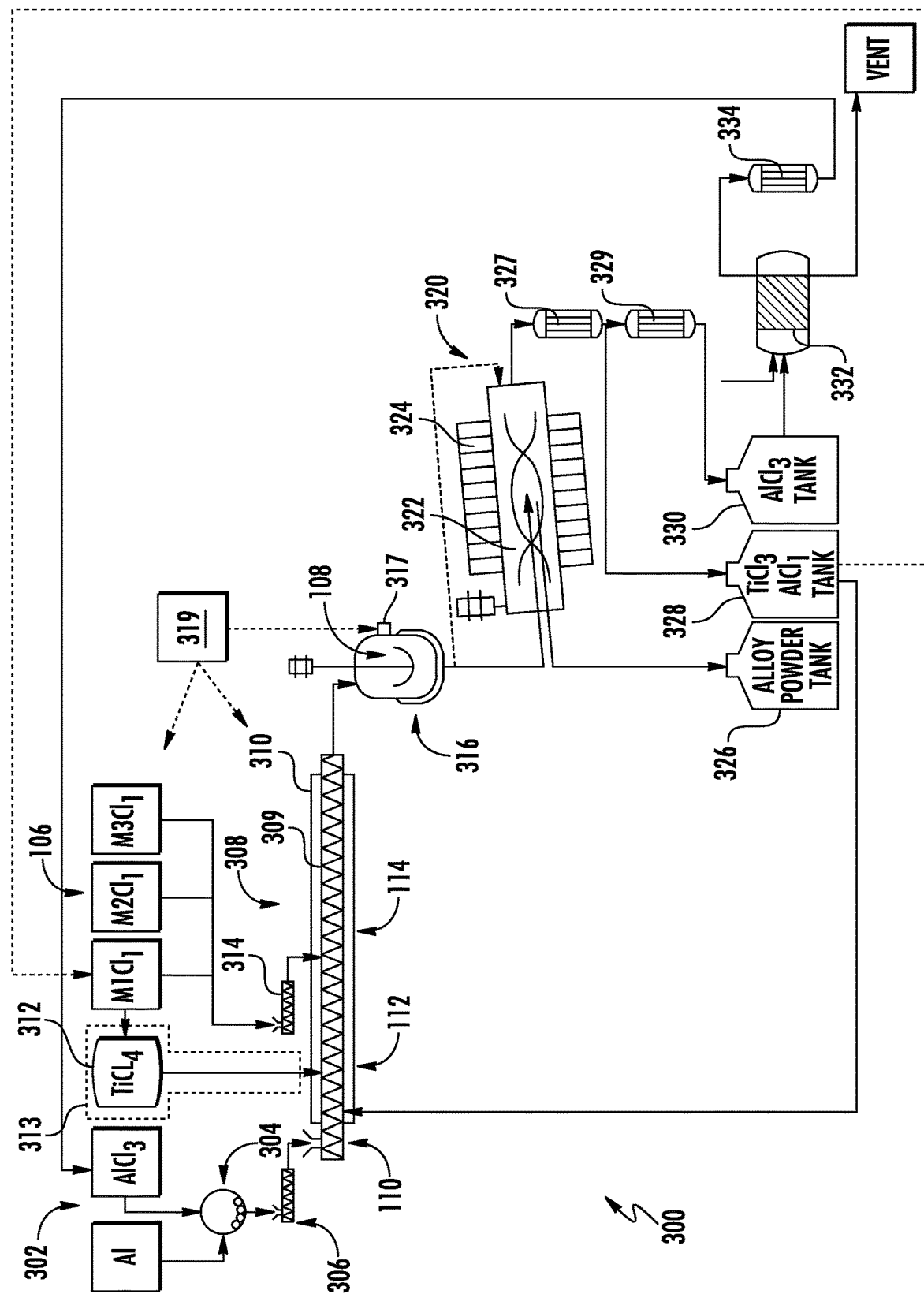
FIG. 3 shows a schematic diagram of one exemplary embodiment of the process for forming titanium alloy material.
Figure 4:
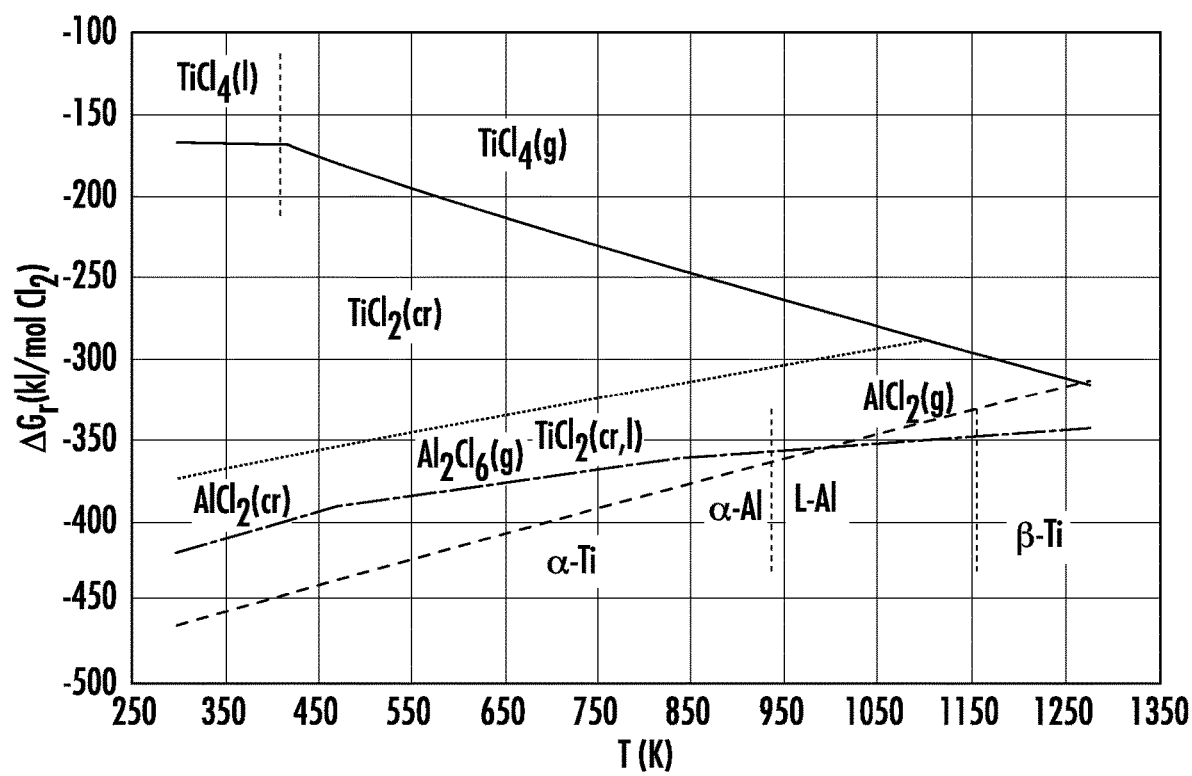
FIG. 4 shows stability diagrams (Gibbs energy per mole of $Cl_2$ vs. absolute T) for Ti—Cl and Al—Cl systems overlaid to show reducing potential of metallic Al [1, 2, 3]. Only pure elements (Ti, Al and $Cl_2$) and pure salt compounds ($TiCl_4$, $TiCl_3$, $TiCl_2$ and $AlCl_3$) are considered because there is no assessed thermodynamic data for salt solution phases ($TiCl_4(AlCl_3)_x$, $TiCl_3(AlCl_3)_x$, $TiCl_2(AlCl_3)_x$).

Referring to FIG. 3, an exemplary process schematic 300 is generally shows solid input materials 302 that include Al and $AlCl_3$ supplied into a size reduction apparatus 304 (shown as a ball mill) with an inert atmosphere. In one embodiment, the Al surface activation and size reduction process is continuous. As stated, reducing the size of the particles allows the surface area of the particles to increase to expand the availability of aluminum in the subsequent reduction reactions. From the size reduction apparatus 304, the input material 302 is passed through a solids feeder 306 and into the reactor 308 where it is heated in the first zone 110 as described above (e.g., at the first reaction temperature of about 100° C. to about 160° C.

Then, the reactor 308 passes the input material 302 sequentially through the first zone 110, the second zone 112, and the third zone 114. Zone heating apparatus 310 surrounds reaction chamber 309 so as to control, independently, the temperature within the respective zones 110, 112, 114. In particular embodiments, the temperature in the first zone 110 is in the range of about 100° C. to about 160° C. for $TiCl_4$ injection to start the reduction of $Ti^{4+}$ to $Ti^{3+}$; the temperature in the second zone 112 is in the range of about 160° C. to about 250° C. such that the reduction of $Ti^{4+}$ to $Ti^{3+}$ is carried forward to complete $Ti^{3+}$ to $Ti^{2+}$ and Al is effectively consumed at the end of the second zone 112; and the temperature in the third zone is about 200° C. to about 300° C. for homogenizing and adding more reactive alloy elements.

After the input mixture is heated in the first zone 112 as discussed above, tank 312 supplies $TiCl_4$ in liquid and/or vapor phase to the reaction chamber 309 (e.g., within a heating zone 313) within various points of the first zone 112 and the beginning of the second zone 112. The $TiCl_4$ is added to the input mixture for reduction of the $Ti^{4+}$ to $Ti^{3+}$ at the second reaction temperature of about 110° C. to about 200° C. (e.g., about 125° C. to about 180° C., such as about 130° C. to about 175° C.

Then, the $Ti^{3+}$ is further reduced to $Ti^{2+}$ at a third reaction temperature (that is greater than the second reaction temperature) in the third zone 114, where one or more alloying element chlorides 106 can optionally be inputted into the third zone 114 via a solids feeder 314. For example, the one or more alloying element chlorides 106 can include some or all alloy elements to achieve a desired chemistry in the titanium alloy material. The alloying element chloride is represented as $MCl_x$, with M being an alloying element that includes metals and other elements that can be included within the final alloy material, with any combination of major and minor elements. Particularly suitable alloying elements include, but are not limited to, aluminum, titanium, vanadium, chrome, niobium, iron, yttrium, boron, manganese, molybdenum, tin, zirconium, silicon, carbon, nickel, copper, tungsten, beryllium, zinc, germanium, lithium, magnesium, scandium, lead, gallium, erbium, cerium, tantalum, osmium, rhenium, antimony, uranium, iridium, and combinations thereof. In particular embodiments, for example, $CrCl_3$ and/or $NbCl_5$ may be added after all of the Al has been consumed in the reaction process, so as to prevent reduction thereof.

For example, the reduction of $Ti^{3+}$ to $Ti^{2+}$ can be performed at third reaction temperature of about 180° C. or higher (e.g., about 180° C. to about 500° C., such as about 180° C. to about 300° C.).

The reaction product (i.e., the $Ti^{2+}$ salt intermediate) is, in the embodiment shown, supplied from the reaction chamber 309 to a storage vessel 316, such as in the form of a $TiCl_2$ complexed with metal chloride(s), such as $TiAlCl_5$, $Ti(AlCl_4)_2$, or a mixture thereof. Within storage vessel 316, the $Ti^{2+}$ salt intermediate can remain in a condensed state and in an inert atmosphere. In particular embodiments, the composition of the $Ti^{2+}$ salt intermediate in the storage vessel 316 may be measured and adjusted so as to control the composition of the resulting Ti-alloy. Without wishing to be bound by any particular theory, it is believed that the composition of the $Ti^{2+}$ salt intermediate in the storage vessel 316 has a direct relationship with the resulting Ti-alloy.

In one particular embodiment, the storage vessel 316 includes sensors 317 to measure the composition of the [$Ti^{2+}$:salt] therein. The sensors 317 can be connected to a feedback control unit 319 that is in communication with the stage 1 reaction feeds and/or reaction zones to adjust the composition of the [$Ti^{2+}$: salt] supplied to 316.

From the storage vessel 316, the $Ti^{2+}$ salt intermediate is supplied to the rotary kiln 320, or other spinning reaction chamber, having a reaction chamber 322 and zone heating apparatus 324, where the $Ti^{2+}$ salt is reduced to Ti alloy via a disproportionation reaction. The zone heating apparatus 324 serves to heat the $Ti^{2+}$ salt via a disproportionation reaction at a disproportionation reaction temperature as discussed above (e.g., about 300° C. to about 1000° C., such as about 500° C. to about 900° C.). Without wishing to be bound by any particular theory, it is believed that the temperature zone at which the [$Ti^{2+}$:salt] is added to kiln 320 is directly related to the Ti-Alloy composition formed. For example, to form γ-TiAl, the [Ti2+;salt] may be added to a cold end and passed through an increasing thermal profile, such as with the optional use of a dam and/or helix to control residence time in different zones. Alternatively, to form α-[Ti], the [Ti$^{2+}$;salt] may be added to a hot end, such as with the use of a rotary helix to control residence time in hot zone (particle coarsening).

The Ti alloy product can be collected into an alloy powder tank 326, while the other reaction products can be taken off as by-products into the sublimation chambers 327, 329 where the Ti$^{3+}$ substituents (e.g., TiCl$_3$—AlCl$_x$) are re-captured into the first storage tank 328 and the AlCl$_3$ is re-captured into the second storage tank 330. The AlCl$_3$ can be further processed (e.g., distilled in the distillation chamber 332 and sublimated in the sublimation chamber 334) so as to be recycled and reintroduced into the input mixture 302.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A process for producing a titanium alloy material, comprising:
    heating an input mixture to a preheat temperature, wherein the input mixture comprises aluminum, optionally, AlCl$_3$, and, optionally, one or more alloying element halide;
    introducing TiCl$_4$ to the input mixture at a first reaction temperature such that substantially all of the Ti$^{4+}$ in the TiCl$_4$ is reduced to Ti$^{3+}$, wherein the Ti$^{3+}$ is complexed with AlCl$_3$ to form TiCl$_3$(AlCl$_3$)$_x$ with x being greater than 0 to 10, and wherein the reduction of Ti$^{4+}$ to Ti$^{3+}$ is performed in an inert atmosphere having a pressure of 93.3 kPa to 506.6 kPa, and wherein the first reaction temperature is 110° C. to 200° C.;
    thereafter, heating to a second reaction temperature such that substantially all of the Ti$^{3+}$ is reduced to Ti$^{2+}$ to form an intermediate mixture, wherein the intermediate mixture comprises a Ti$^{2+}$ salt, wherein heating to the second reaction temperature is performed in an inert atmosphere having a pressure of 93.3 kPa to 506.6 kPa, and wherein the second reaction temperature is 180° C. to 250° C.; and
    introducing the intermediate mixture into a reaction chamber at a disproportionation temperature to form the titanium alloy material from the Ti$^{2+}$ via a disproportionation reaction, wherein the disproportionation temperature is 300° C. to 900° C., and wherein the disproportionation reaction is performed in an inert atmosphere having a pressure of 101 kPa to 506.6 kPa.

2. The process of claim 1, wherein the input mixture includes a mixture of some or all alloy elements to achieve a desired chemistry in the titanium alloy material.

3. The process of claim 1, wherein the input mixture comprises a plurality of particles, wherein the plurality of particles comprise aluminum, AlCl$_3$, and, optionally, one or more alloying element halide.

4. The process of claim 1, wherein the TiCl$_4$ is added as a liquid, and wherein the input mixture substantially remains a solid at the first reaction temperature.

5. The process of claim 1, wherein reducing the Ti$^{4+}$ in the TiCl$_4$ to form is performed sequentially in zones of a common reactor.

6. The process of claim 1, further comprising:
    after heating to the second reaction temperature, collecting the intermediate mixture as a solid or liquid in a storage vessel.

7. The process of claim 6, wherein the storage vessel has a storage temperature that is about 170° C. to about 500° C.

8. The process of claim 6, further comprising:
    measuring the composition of the intermediate mixture; and
    adjusting the composition of the intermediate mixture by adding at least one alloying element.

9. The process of claim 1, wherein the intermediate mixture contains dissolved Al in the Ti$^{2+}$ salt, but is substantially free of any particles of Al metal.

10. The process of claim 1, wherein at least a portion of the Ti$^{2+}$ is in the form of TiCl$_2$ complexed with metal halide(s).

11. The process of claim 1, wherein the intermediate mixture comprising Ti$^{2+}$ is maintained at the disproportionation reaction temperature until substantially all of the Ti$^{2+}$ is reacted.

12. The process of claim 1, further comprising:
    processing the titanium alloy material for direct consolidation, additive manufacturing, bulk melting, or spheroidization.

13. The process of claim 1, further comprising:
    processing the titanium alloy material at a processing temperature to purify the Ti alloy by removing residual halides and/or allowing diffusion to reduce composition gradients, wherein the processing temperature is about 800° C. or higher.

14. The process of claim 13, wherein the processing also continues disproportionation reactions to produce Ti alloy from any residual Ti$^{3+}$.

15. The process of claim 1, wherein the halide of the one or more alloying element halide is chloride.

16. The process of claim 1, wherein x is 1 to 10.

17. The process of claim 1, wherein x is 1 to 5.

* * * * *